United States Patent [19]

Kimura et al.

[11] Patent Number: 4,643,928
[45] Date of Patent: Feb. 17, 1987

[54] COEXTRUSION MULTI-LAYER TUBULAR FILM

[75] Inventors: Masakatsu Kimura; Osamu Nakamura, both of Sodegaura, Japan

[73] Assignee: Idemitsu Petrochemical Co., Ltd., Tokyo, Japan

[21] Appl. No.: 674,078

[22] Filed: Nov. 23, 1984

[30] Foreign Application Priority Data

Dec. 12, 1983 [JP] Japan ................... 58-232688

[51] Int. Cl.$^4$ ............. B32B 27/32; B29D 9/00; B65D 65/40
[52] U.S. Cl. ...................... 428/36; 428/516; 264/176.1
[58] Field of Search ................... 428/36, 516

[56] References Cited

U.S. PATENT DOCUMENTS 3,937,758  2/1976  Castagna ................. 525/245
4,434,264  2/1984  Ficker ..................... 524/323

FOREIGN PATENT DOCUMENTS 0002606  6/1979  European Pat. Off. .
0095299  11/1983  European Pat. Off. .

Primary Examiner—P. C. Ives
Attorney, Agent, or Firm—Frishauf, Holtz, Goodman & Woodward

[57] ABSTRACT

A coextrusion multi-layer tubular film comprising: an outer layer comprises a linear ethylene α-olefin copolymer having a density of from 0.900 to 0.945 gram per cubic centimeter; and an inner layer made of (i) a polypropylene-based resin or (ii) a resin composition comprising from 60 to 98% by weight of a polypropylene-base resin and from 40 to 2% of an ethylene α-olefin copolymer having a density of from 0.850 to 0.945 gram per cubic centimeter; the ratio of said outer layer to said inner layer being from 50:50 to 97:3.

13 Claims, 1 Drawing Figure

COEXTRUSION MULTI-LAYER TUBULAR FILM

BACKGROUND OF THE INVENTION

The present invention relates to a coextrusion multi-layer tubular film. More particularly, it is concerned with a coextrusion multi-layer tubular film which is superior in mechanical strength and transparency, and further which is free from curling even in the high-speed quenching molding method and does not cause blocking.

Heretofore, tubular films produced by inflation molding of low density polyethylenes produced by the high-pressure polymerization method have been widely used as packaging films for various purposes. These films, however, have a disadvantage in that the mechanical strength is not sufficiently high, although they are superior in transparency.

Compared with the above low density polyethylene films, those films made of linear low density ethylene α-olefin copolymers are superior in mechanical strength. In recent years, therefore, such linear low density ethylene α-olefin copolymer films have received increasing attention from a viewpoint of saving resources through a reduction in film thickness, and they are expected to be utilized in various fields. When, however, such linear low density ethylene α-olefin copolymers are molded by the commonly used inflation molding method, i.e., up blow air-cooling inflation molding, the ultimate tubular films are not always satisfactory in optical properties such as transparency and gloss. Moreover, in this air cooling method, the quenching effect is low, and if the air speed is increased, a fluctuation in resinous bubble occurs vigorously and the molding cannot be performed stably. In any case, films having superior transparency cannot be molded at high speeds and in a stabilized manner.

It has, therefore, been proposed to quench the resinous bubble by the down blow water-cooling inflation molding method which is known to have a high quenching effect. In accordance with this method, films can be produced which are greatly improved in transparency. On the contrary, the films are reduced in anti-blocking properties. Thus they suffer from disadvantages that opening properties are poor and molding itself becomes difficult owing to the occurrence of blocking. This blocking may be prevented by increasing the amount of antiblocking agents added. If, however, the amount of antiblocking agents added is increased, they inevitably exert an adverse influence on transparency.

In the down blow water-cooling inflation molding method, the transparency of films can be further improved by increasing the degree of quenching. In this case, however, a fundamental and serious problem arises in that the film is curled toward the inside thereof. If this curling occurs, there can be obtained only films which have a appearance. Thus the films are low in product value. Moreover they have disadvantages in that handling during the molding and cutting process is difficult, workability for printing and production of bags drops, and the ultimate bags are bad in appearance due to the formation of stains, for example, in the production thereof. In the down blow water-cooling inflation molding method, although an improvement in transparency of films can be attained, the above problems of blocking and curling are undesirably involved.

As described above, tubular films of linear low density ethylene α-olefin copolymers, which are superior in transparency, have good opening properties and anti-blocking properties, and further are reduced in curling, have not yet been produced.

SUMMARY OF THE INVENTION

As a result of extensive investigations to develop linear low density ethylene α-olefin copolymer films which are superior in transparency and are usable for practical purposes, it has been found that if an inner layer made of a polypropylene-based resin or a resin composition composed mainly of the polypropylene-based resin is provided, there can be obtained tubular films which are superior in transparency, opening properties, and anti-blocking properties, for example, and are reduced in the formation of curl.

The present invention relates to a coextrusion multi-layer tubular film comprising:
- an outer layer made of a linear ethylene α-olefin copolymer having a density of from 0.900 to 0.945 gram per cubic centimeter; and
- an inner layer made of a polypropylene-based resin, or a resin composition comprising a polypropylene-based resin and an ethylene α-olefin copolymer having a density of from 0.850 to 0.945 gram per cubic centimeter.

BRIEF DESCRIPTION OF THE DRAWING

The figure is a schematic illustration of an embodiment of the down blow multi-layer water-cooling inflation molding method.

1, 1'... extruders, 2... circular die, 3... air ring, 4... cooling water, 5... resinous bubble

DETAILED DESCRIPTION OF THE INVENTION

Figure 1:
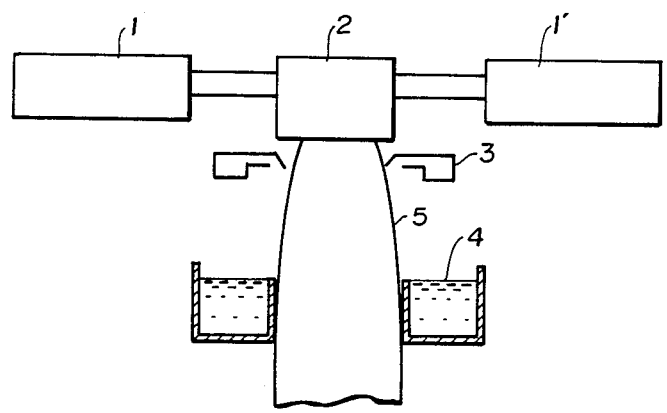

The outer layer of the coextrusion multi-layer tubular film of the present invention is made of a linear ethylene α-olefin copolymer having a density of from 0.900 to 0.945 gram per cubic centimeter, preferably from 0.910 to 0.940 gram per cubic centimeter. The melt index of the linear ethylene α-olefin copolymer is from 0.5 to 20 grams per ten minutes and preferably from 1.0 to 10 grams per ten minutes.

The linear ethylene α-olefin copolymer is a linear low density polyethylene as produced by the medium or low pressure polymerization method. α-Olefins (excluding ethylene) which are to be copolymerized with ethylene are not critical in the present invention. Usually, α-olefins having from 3 to 15 carbon atoms, preferably from 4 to 12 carbon atoms, such as propylene, butene-1, pentene-1, hexene-1, octene-1, 4-methylpentene-1, decene-1, and dodecene-1 are used. The α-olefin content of the linear low density ethylene α-olefin copolymer is usually from 1 to 20 percent by weight, and its melting point is from 110° to 130° C. As well as a single linear low density ethylene α-olefin copolymer, a mixture of copolymers having different densities and/or melt indexes can be used.

In the preparation of the inner layer of the co-extrusion composite tubular film of the present invention, a polypropylene-based resin or a resin composition comprising a polypropylene-based resin and an ethylene α-olefin copolymer having a density of from 0.850 to 0.945 gram per cubic centimeter is used. This polypropylene-based resin includes, as well as a propylene homopolymer, block and random copolymers of propylene and 20 percent by weight or less of one or more other α-olefins such as ethylene, butene-1, hexene-1, and 4-methylpentene-1. Usually those polypropylene-based resins having a density of from 0.895 to 0.915 gram per cubic centimeter, a melting point of from 130° to 175° C., and a melt index of from 0.5 to 20 grams per ten minutes, preferably from 1.0 to 15 grams per ten minutes are used.

The objects of the present invention can be attained by using the above-defined propylene-based resin alone in the preparation of the inner layer of the coextrusion multi-layer tubular film of the present invention; that is, even if the inner layer is made of the polypropylene-based resin alone, there can be obtained a coextrusion multilayer tubular film which is superior in transparency and antiblocking properties, and further in which the formation of curl is prevented. In some cases, however, melt sealability during the bag-production process is not always sufficiently satisfactory depending on the type of the polypropylene-based resin, molding conditions, ratio of inner layer and outer layer, and so forth. It is preferred, therefore, that the inner layer of the coextrusion multi-layer tubular film of the present invention be made of a resin composition comprising the polypropylene-based resin and an ethylene α-olefin copolymer having a density of from 0.850 to 0.945 gram per cubic centimeter.

The ethylene α-olefin copolymer includes the above-described linear ethylene α-olefin copolymers, and ethylene α-olefin copolymers which are of low crystallinity or are non-crystalline. When a linear low density ethylene α-olefin copolymer is used in the preparation of the inner layer, it may be the same as or different from that used in the preparation of the outer layer. Low crystallinity or non-crystalline ethylene α-olefin copolymers include copolymers of ethylene and α-olefins haivng from 3 to 12 carbon atoms, such as propylene, butene-1, and hexene-1, and terpolymers of the above copolymers and a third component, such as butadiene, 1,4-hexadiene, and 5-ethylidene-2-norbornen. For these ethylene α-olefin copolymers, the density is from 0.850 to 0.910 gram per cubic centimeter, preferably from 0.860 to 0.900 gram per cubic centimeter, the melt index is from 0.1 to 50 grams per ten minutes, the degree of crystallization is 40 percent or less, and the melting point is 100° C. or less. Typical examples of these ethylene α-olefin copolymers are an ethylene propylene copolymer, an ethylene butene-1 copolymer, and an ethylene propylene 5-ethylidene-2-norbornene terpolymer.

The resin composition for the inner layer of the coextrusion multi-layer tubular film of the present invention is composed of from 60 to 98 percent by weight of the polypropylene-based resin and from 40 to 2 percent by weight of the ethylene α-olefin copolymer, and preferably from 70 to 97 percent by weight of the polypropylene-based resin and from 30 to 3 percent by weight of the ethylene α-olefin copolymer. If the proportion of the ethylene α-olefin copolymer is less than 2 percent by weight, the melt sealability is improved only insufficiently. On the other hand, if it is in excess of 40 percent by weight, transparency and antiblocking properties of the film are reduced and melt sealability is not always increased.

In the coextrusion multi-layer tubular film of the present invention, it is necessary that the thickness of the outer layer be at least 50 percent of the total thickness of the film. The ratio of outer layer and inner layer is usually from 50:50 to 98:2 and preferably from 60:40 to 95:5. If the ratio of outer layer and inner layer ratio is less than 50:50, the best use cannot be made of the superior characteristics of the film of linear low density ethylene α-olefin copolymers. On the other hand, if the ratio is more than 98:2, the formation of curl cannot be prevented in molding by the down blow water-cooling inflation molding method.

The coextrusion multi-layer tubular film of the present invention basically comprises an outer layer and an inner layer as described above. If necessary, a layer of low density polyethylene produced by the high pressure polymerization method, for example may be further provided on the outside of the outer layer by coextrusion. That is, the term "coextrusion multi-layer tubular film" as used herein includes a coextrusion multi-layer tubular film comprising the above two essential layers and one or more additional layers.

In the resins constituting the outer and inner layers of the coextrusion multi-layer tubular film of the present invention may be incorporated stabilizers (e.g., anti-oxidants and ultraviolet absorbers), lubricants, anti-blocking agents, antistatic agents, and colorants, for example, within the range that does not deteriorate the characteristics of the coextrusion multi-layer tubular film. To the polypropylene-based resin for the inner layer, nucleating agents can be added. These nucleating agents function to control a rate of formation of crystal nuclei in the polypropylene-based resin, to accelerate the rate of crystallization, and further to control the size of crystals. Organic nucleating agents include metal salts of organic acids, such as magnesium, calcium, sodium, aluminum, or titanium salts of benzoic acid, cyclohexanecarboxylic acid, diphenylacetic acid, isonicotinic acid, adipic acid, sebacic acid, phthalic acid, benzenesulfonic acid, and glycolic acid; amine salts of organic acids, such as amines derived from benzoic acid, phthalic acid, and adipic acid; and dibenzylidene-sorbitol. Inorganic nucleating agents include finely powdered silica, alumina, and talc. Addition of such nucleating agents enables an increase in the transparency and curl-preventing properties of the ultimate film.

In addition to additives as described above, other thermoplastic resins and elastomers, for example, can be added within the range that does not deteriorate the characteristics of the coextrusion multi-layer tubular film of the present invention.

The coextrusion multi-layer tubular film of the present invention can be produced by various molding techniques. For example, the respective resins of the outer and inner layers are melt kneaded in an extrusion molding machine, extruded through a circular die, and then molded by the down blow water-cooling inflation molding method or the up blow air-cooling inflation molding method or the spray cooling inflation molding method, for example. Particularly preferred is the down blow water-cooling inflation molding method, an embodiment of which is schematically illustrated in the figure, in view of cooling efficiency, molding speed, high transparency of the ultimate film, etc.

The blow up ratio in the inflation molding is usually from 0.8 to 3.0 and preferably from 1.0 to 2.5. Corn starch, for example, may be sprayed on the outer surface of the produced film for the purpose of preventing blocking. The thickness of the coextrusion multi-layer tubular film of the present invention is not critical and usually from 5 to 200 microns; it is determined appropriately within the above range depending on the purpose for which the ultimate film is used.

The coextrusion multi-layer tubular film of the present invention has various advantages. For example, since the above-specified resins are used in the prepartion of the outer and inner layers of the coextrusion multi-layer tubular film, even if quenching, particularly water-cooling is applied in inflation molding of the film, the problem of curling as encountered in producing a single-layer film of linear low density ethylene α-olefin copolymers does not arise. Furthermore the problem of blocking as involved in quenching does not occur at all; rather the quenching using water permits to more increase the transparency of the film.

The coextrusion multi-layer tubular film of the present invention is superior in moldability, transparency, anti-blocking properties, strength, and so forth, and further is free from curling. Thus it is superior in fabricability (conversion characteristics of film) such as printing and bag-production. In particular, the transparency of the coextrusion multi-layer tubular film of the present invention is very high compared with conventional tubular films made mainly of linear low density polyethylenes. Thus the coextrusion multi-layer tubular film of the present invention is useful as a packaging material for clothes, foodstuffs, and general goods, for example. In particular, in view of its transparency and polyvinyl alcohol film like flexibility, it is very useful as a cloth-packaging material.

The present invention is described in greater detail with reference to the following examples.

EXAMPLES 1 TO 10

Resins for the outer and inner layers as shown in Table 1 were supplied to the respective extruders (diameter: 50 millimeters; L/D=26) where they were melt kneaded. They were then introduced in a circular die (diameter: 150 millimeters; die lip clearance: 2 millimeters) and coextruded downwardly therethrough at a rate of 50 kilograms per hour, and molded into a film by the down blow water-cooling inflation molding method (where the outer peripheral surface was cooled with cooling water maintained at 25° C.) at a blow up ratio of 1.3 to produce a coextrusion two-layer tubular film having a thickness of 40 microns.

The melting point of the resin was measured according to ASTM D-3417 by the use of a differential scaning calorimeter (DSC) and a temperature corresponding to the peak of an endothermic curve was determined as the melting point.

Physical properties and sealability of the films were measured, and the results are shown in Table 1.

COMPARATIVE EXAMPLE 1

A tubular film was produced in the same manner as in Example 1 except that the propylene-based resin was replaced by a high density polyethylene resin. The results are shown in Table 1.

COMPARATIVE EXAMPLE 2

A single layer film of a linear low density polyethylene was produced following the procedure of Example 1. The results are shown in Table 1.

TABLE 1

| Run No. | Resin of Outer Layer | Resin of Inner Layer | | Outer Layer/ Inner Layer Ratio | Tensile Strength[1] (MD/TD) kg/cm² | Elongation[1] (MD/TD) % | Tensile Modulus[1] (MD/TD) kg/cm² |
|---|---|---|---|---|---|---|---|
| Example 1 | LLDPE-1 | PP-1 | | 90/10 | 404/310 | 680/700 | 2450/2750 |
| Example 2 | LLDPE-1 | PP-1 | | 80/20 | 413/352 | 660/720 | 3960/3900 |
| Example 3 | LLDPE-1 | PP-1 | | 70/30 | 438/369 | 620/700 | 4650/4640 |
| Example 4 | LLDPE-1 | PP-2 | | 80/20 | 372/367 | 610/700 | 2660/3260 |
| Example 5 | LLDPE-2 | PP-1 | | 80/20 | 410/348 | 640/680 | 3800/3700 |
| Example 6 | LLDPE-1 | PP-1 LLDPE-1 | 95 5 | 80/20 | 425/350 | 620/680 | 3900/3800 |
| Example 7 | LLDPE-1 | PP-1 LLDPE-1 | 90 10 | 80/20 | 439/346 | 560/640 | 3810/3740 |
| Example 8 | LLDPE-1 | PP-1 LLDPE-1 | 90 10 | 70/30 | — | — | — |
| Example 9 | LLDPE-2 | PP-1 LLDPE-2 | 90 10 | 80/20 | — | — | — |
| Example 10 | LLDPE-1 | PP-1 EPR | 95 5 | 80/20 | — | — | — |
| Comparative Example 1 | LLDPE-1 | HDPE | | 80/20 | 475/358 | 660/770 | 3010/3000 |
| Comparative Example 2 | | LLDPE-1 | | — | 410/322 | 620/740 | 1820/1760 |

| Run No. | Tear Strength[1] (MD/TD) kg/cm | Impact Strength[2] kg·cm/cm | Puncture Strength[3] kg·cm/cm | Haze[4] % | Gloss[5] % | Anti-Curling[6] | Anti-Blocking Properties | Seal Temperature °C. | Seal Strength[7] kg/25 mm |
|---|---|---|---|---|---|---|---|---|---|
| Example 1 | 90.0/154 | 1820 | 11300 | 2.3 | 172 | A | A | 300 | 0.75 |
| Example 2 | 76.0/146 | 1780 | 12900 | 2.1 | 162 | A | A | 300 | 0.68 |
| Example 3 | 55.0/163 | 1890 | 12700 | 2.0 | 161 | A | A | 300 | 0.65 |
| Example 4 | 83.0/160 | 2020 | 12200 | 1.2 | 164 | A | B | 260 | 0.64 |
| Example 5 | 74.0/140 | 1750 | 12800 | 1.8 | 163 | A | A | 300 | 0.70 |
| Example 6 | 68.0/170 | 1900 | 13200 | 4.0 | 130 | A | A | 250 | 0.95 |
| Example 7 | 56.8/190 | 2110 | 13400 | 4.1 | 115 | A | A | 250 | 1.01 |
| Example 8 | — | — | — | 4.2 | — | A | A | 250 | 1.12 |
| Example 9 | — | — | — | 4.2 | — | A | A | 250 | 0.98 |
| Example 10 | — | — | — | 7.4 | 101 | A | A | 260 | 1.08 |
| Comparative Example 1 | 116/99.2 | 1900 | 9640 | 6.5 | 103 | B | A | — | — |
| Comparative Example 2 | 167/212 | 2800 | 14300 | 1.5 | 140 | C | C | — | — |

TABLE 1-continued

Example 2

Note:

| | | Density (g/cm³) | Melt Index (g/10 min) | Melting Point (°C.) |
|---|---|---|---|---|
| LLDPE-1 | Ethylene octene-1 copolymer | 0.927 | 4.9 | 125 |
| LLDPE-2 | Ethylene 4-methyl-pentene-1 copolymer | 0.925 | 2.4 | 124 |
| PP-1 | Propylene homopolymer | 0.91 | 8.0 | 170 |
| PP-2 | Propylene random polymer | 0.90 | 7.0 | 155 |
| EPR | Ethylene propylene copolymer | 0.86 | 1.9 | — |
| HDPE | High density polyethylene | 0.955 | 0.05 | 132 |

*[1]Measured according to JIS Z1702.
*[2]Measured according to JIS P8134.
*[3]Measured by the film impact method. A film specimen is fixed in the form of a ring and punctured with a pendulum having a 1-inch impact head, and an amount of energy needed for this is measured.
*[4]Measured according to ASTM D1003.
*[5]Measured according to ASTM D523.
*[6]Determined by observing the films with the naked eye. The rating scale is as follows:
A: No curling, B: Curling occurs to a certain extent, C: Curling occurs seriously.
*[7]Measured according to JIS Z1707.

What is claimed is:

1. A coextrusion multi-layer tubular film comprising:
   an outer layer comprising a linear ethylene α-olefin copolymer having a density of from 0.900 to 0.945 gram per cubic centimeter; and
   an inner layer made of (i) a polypropylene-base resin or (ii) a resin composition comprising from 70 to 97% by weight of a polypropylene-base resin and from 30 to 3% of an ethylene α-olefin copolymer having a density of from 0.850 to 0.945 gram per cubic centimeter; and
   the ratio of said outer layer to said inner layer being from 70:30 to 95:5.

2. The film as claimed in claim 1, wherein the linear ethylene α-olefin copolymer constituting the outer layer contains from 1 to 20 percent by weight of an α-olefin having from 3 to 20 carbon atoms.

3. The film as claimed in claim 1, wherein the polypropylene-base resin is a propylene homopolymer, or a block or random copolymer of propylene and 20 percent by weight or less of one or more other α-olefins.

4. The film as claimed in claim 1, wherein said inner layer comprises said polypropylene-base resin and said ethylene α-olefin copolymer, and said ethylene α-olefin copolymer is a linear ethylene α-olefin copolymer containing from 1 to 20 percent by weight of an α-olefin having from 3 to 20 carbon atoms or ethylene α-olefin copolymer of low-crystallinity or which is (b) non-crystalline.

5. The film as cliamed in claim 4, wherein said ethylene α-olefin copolymer is said low-crystalline or non-crystalline ethylene and is a copolymer of ethylene and an α-olefin having from 3 to 12 carbon atoms.

6. The film as claimed in claim 4, wherein the ethylene α-olefin copolymer is a copolymer having a density of from 0.850 to 0.910 gram per cubic centimeter.

7. The film as claimed in claim 2, wherein the polypropylene-base resin is a propylene homopolymer, or a block or random copolymer of propylene and 20 percent by weight or less of one or more other α-olefins.

8. The film as claimed in claim 2, wherein said inner layer comprises said polypropylene-base resin and said ethylene α-olefin copolymer, and said ethylene α-olefin copolymer is a linear ethylene α-olefin copolymer containing from 1 to 20 percent by weight of an α-olefin having from 3 to 20 carbon atoms or ethylene α-olefin copolymer of (a) low-crystallinity or which is (b) non-crystalline.

9. The film as claimed in claim 8, wherein said inner layer comprises from 70 to 97% of said polypropylene-base resin and from 30 to 3% of said ethylene α-olefin copolymer.

10. The film as claimed in claim 8, wherein the ethylene α-olefin copolymer is a copolymer having a density of from 0.850 to 0.910 gram per cubic centmeter.

11. The film as claimed in claim 10, wherein said inner layer comprises from 70 to 97% of said polypropylene-base resin and from 30 to 3% of said ethylene α-olefin copolymer.

12. The film as claimed in claim 1, wherein said inner layer comprises from 70 to 97% of said polypropylene-base resin and from 30 to 3% of said ethylene α-olefin copolymer.

13. The film as claimed in claim 1, wherein said polypropylene-base resin has a density of from 0.895 to 0.915 gram per cubic centimeter, a melting point of from 130° to 175° C. and a melt index of from 1.0 to 15 grams per 10 minutes.

* * * * *